United States Patent
Anezaki et al.

(10) Patent No.: US 10,308,728 B2
(45) Date of Patent: Jun. 4, 2019

(54) METHOD OF PRODUCTION OF MODIFIED CONJUGATED DIENE RUBBER

(71) Applicant: ZEON CORPORATION, Tokyo (JP)

(72) Inventors: Satoshi Anezaki, Tokyo (JP); Takeshi Sugimura, Tokyo (JP); Hidenori Yamagishi, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 188 days.

(21) Appl. No.: 15/129,855

(22) PCT Filed: Mar. 27, 2015

(86) PCT No.: PCT/JP2015/059590
§ 371 (c)(1),
(2) Date: Sep. 28, 2016

(87) PCT Pub. No.: WO2015/152038
PCT Pub. Date: Oct. 8, 2015

(65) Prior Publication Data
US 2017/0137541 A1 May 18, 2017

(30) Foreign Application Priority Data
Mar. 31, 2014 (JP) ................................ 2014-074945

(51) Int. Cl.
| | | |
|---|---|---|
| *C08C 19/25* | (2006.01) | |
| *B60C 1/00* | (2006.01) | |
| *C08K 3/36* | (2006.01) | |
| *C08L 15/00* | (2006.01) | |
| *C08F 236/10* | (2006.01) | |
| *C08C 19/22* | (2006.01) | |
| *C08C 19/44* | (2006.01) | |
| *C08K 3/06* | (2006.01) | |
| *C08K 3/22* | (2006.01) | |
| *C08K 5/09* | (2006.01) | |
| *C08K 5/18* | (2006.01) | |
| *C08K 5/31* | (2006.01) | |
| *C08K 5/47* | (2006.01) | |
| *C08K 5/548* | (2006.01) | |
| *C08L 91/00* | (2006.01) | |

(52) U.S. Cl.
CPC ............... *C08C 19/25* (2013.01); *B60C 1/00* (2013.01); *B60C 1/0016* (2013.01); *B60C 1/0025* (2013.01); *B60C 1/0041* (2013.01); *C08C 19/22* (2013.01); *C08C 19/44* (2013.01); *C08F 236/10* (2013.01); *C08K 3/06* (2013.01); *C08K 3/22* (2013.01); *C08K 3/36* (2013.01); *C08K 5/09* (2013.01); *C08K 5/18* (2013.01); *C08K 5/31* (2013.01); *C08K 5/47* (2013.01); *C08K 5/548* (2013.01); *C08L 15/00* (2013.01); *C08L 91/00* (2013.01); *B60C 2001/005* (2013.01)

(58) Field of Classification Search
CPC ....................................................... C08C 19/25
See application file for complete search history.

(56) References Cited

U.S. PATENT DOCUMENTS

| | | | |
|---|---|---|---|
| 5,001,196 A | 3/1991 | Kawanaka et al. | |
| 9,790,359 B2 * | 10/2017 | Imoto | ............... C08L 47/00 |
| 2005/0203251 A1 | 9/2005 | Oshima et al. | |
| 2006/0155076 A1 | 7/2006 | Nakamura et al. | |
| 2009/0005497 A1 | 1/2009 | Maeda et al. | |
| 2009/0036567 A1 | 2/2009 | Oshima et al. | |
| 2012/0006229 A1 | 1/2012 | Honma et al. | |
| 2012/0149929 A1 | 6/2012 | Fukushima et al. | |
| 2014/0350277 A1 | 11/2014 | Backer et al. | |

FOREIGN PATENT DOCUMENTS

| | | |
|---|---|---|
| JP | H01-249812 A | 10/1989 |
| JP | 2005-290355 A | 10/2005 |
| JP | 2009-030032 A | 2/2009 |
| JP | 2011-046640 A | 3/2011 |
| JP | 2012-017291 A | 1/2012 |
| WO | 2003/102053 A1 | 12/2003 |
| WO | 2013/083742 A1 | 6/2013 |

OTHER PUBLICATIONS

Jun. 16, 2015 International Search Report issued in Patent Application No. PCT/JP2015/059590.

* cited by examiner

*Primary Examiner* — Vickey Nerangis
(74) *Attorney, Agent, or Firm* — Oliff PLC

(57) ABSTRACT

A method of production of a modified conjugated diene rubber including a first step of polymerizing a monomer containing at least a conjugated diene compound by using a polymerization initiator in an inert solvent so as to obtain a conjugated diene polymer having an active end, and a second step of causing a compound represented by a following formula (1) to react with the active end of the conjugated diene polymer having an active end:

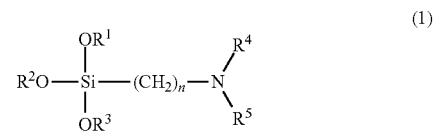

(1)

wherein, in formula (1), each of $R^1$ to $R^3$ independently is an alkyl group having 1 to 4 carbon atoms, $R^4$ is a hydrocarbon group containing an aromatic ring and having 6 to 10 carbon atoms, $R^5$ is an alkyl group having 1 to 6 carbon atoms, and "n" is an integer of 0 to 10.

9 Claims, No Drawings

METHOD OF PRODUCTION OF MODIFIED CONJUGATED DIENE RUBBER

TECHNICAL FIELD

The present invention relates to a method of production of a modified conjugated diene rubber, more particularly relates to a method of production of a modified conjugated diene rubber able to give a cross-linked rubber excellent in low heat buildup and wet grip and suitably used for forming a fuel efficient tire.

BACKGROUND ART

In recent years, fuel efficiency has been strongly sought from automobile tires due to environmental issues and resource issues. On the other hand, excellent wet grip is being sought from the viewpoint of safety. A cross-linked product of a rubber composition including silica as a filler is better in low heat buildup compared with a cross-linked rubber of a rubber composition including carbon black, so the rolling resistance in the case of forming a tire becomes lower. For this reason, by using a cross-linked rubber of a rubber composition containing silica to form a tire, it is possible to obtain a tire excellent in fuel efficiency.

However, even if mixing silica into conventional rubber, rubber and silica are insufficient in compatibility, so easily separate. Due to this, the rubber composition before cross-linking is poor in processability and, further, the cross-linked rubber obtained by cross-linking this becomes insufficient in low heat buildup.

Therefore, to improve the compatibility between rubber and silica, for example, it has been proposed to add the various silane coupling agents such as disclosed in Patent Document 1 or Patent Document 2 etc. into a rubber composition. However, handling a silane coupling agent requires sophisticated processing technique. Further, a silane coupling agent is expensive, so if the amount becomes greater, there is the problem that the manufacturing cost of the tire will become higher.

To solve such a problem, for example, as disclosed in Patent Documents 3 to 5 etc., when using the solution polymerization method to obtain a polymer of rubber, the technique of causing a modifier to react with an active end of the polymer to thereby impart compatibility with silica to the rubber itself has been studied. However, due to the rising demands for fuel efficiency and wet grip from automobile tires in recent year, rubber able to give cross-linked rubber further better in low heat buildup and wet grip has been desired.

RELATED ART

Patent Documents

Patent Document 1: Japanese Patent Publication No. 2011-46640A
Patent Document 2: Japanese Patent Publication No. 2012-17291A
Patent Document 3: Japanese Patent Publication No. 1-249812A
Patent Document 4: International Patent Publication No. WO2003/102053A
Patent Document 5: Japanese Patent Publication No. 2005-290355A

SUMMARY OF THE INVENTION

Problem to be Solved by the Invention

Therefore, the present invention has as its object the provision of a method of production of a modified conjugated diene rubber for producing modified conjugated diene rubber able to give a cross-linked rubber excellent in low heat buildup and wet grip.

Means for Solving the Problem

The present inventors engaged in intensive research for achieving this object and as a result discovered that by modifying a conjugated diene polymer having an active end using a compound having a specific structure as a modifier, modified conjugated diene rubber able to give a cross-linked rubber excellent in low heat buildup and wet grip can be obtained. The present invention was completed based on this discovery.

Therefore, according to the present invention, there is provided a method of production of a modified conjugated diene rubber comprising a first step of polymerizing a monomer containing at least a conjugated diene compound by using a polymerization initiator in an inert solvent so as to obtain a conjugated diene polymer having an active end, and a second step of causing a compound represented by a following formula (1) to react with the active end of the conjugated diene polymer having an active end.

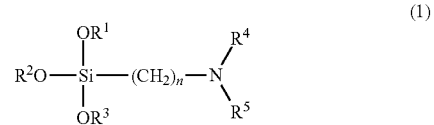

(In the formula (1), each of $R^1$ to $R^3$ independently is an alkyl group having 1 to 4 carbon atoms, $R^4$ is a hydrocarbon group containing an aromatic ring and having 6 to 10 carbon atoms, $R^5$ is an alkyl group having 1 to 6 carbon atoms, and "n" is an integer of 0 to 10.)

In the method of production of a modified conjugated diene rubber, preferably in the second step, the compound represented by the formula (1) is added into an inert solvent in which the conjugated diene polymer having an active end is present in a ratio of 1 to 3 moles with respect to 1 mole of the active end of the conjugated diene polymer having an active end.

In the method of production of a modified conjugated diene rubber, preferably the conjugated diene polymer having an active end contains 50 to 100 wt % of conjugated diene monomer units and 0 to 50 wt % of aromatic vinyl monomer units.

In the method of production of a modified conjugated diene rubber, preferably in the formula (1), each of $R^1$ to $R^3$ independently is a methyl group or ethyl group, $R^4$ is a benzyl group, phenethyl group, or phenylpropyl group, $R^5$ is a methyl group, ethyl group, or propyl group, and "n" is an integer of 3 to 5.

Further, according to the present invention, there is provided a modified conjugated diene rubber obtained by the above method of production of a modified conjugated diene rubber.

Further, according to the present invention, there is provided a rubber composition comprising 100 parts by weight of rubber ingredient containing the above modified conjugated diene rubber and 10 to 200 parts by weight of silica.

The rubber composition preferably further comprises a cross-linking agent.

Further, according to the present invention, there is provided a cross-linked rubber obtained by cross-linking the rubber composition.

Further, according to the present invention, there is provided a tire including the above cross-linked rubber.

Effects of Invention

According to the present invention, it is possible to provide a method of production of a modified conjugated diene rubber for producing modified conjugated diene rubber able to give cross-linked rubber excellent in low heat buildup and wet grip.

DESCRIPTION OF EMBODIMENTS

[Method of Production of Modified Conjugated Diene Rubber]

The method of production of a modified conjugated diene rubber of the present invention includes a first step of polymerizing a monomer containing at least a conjugated diene compound by using a polymerization initiator in an inert solvent so as to obtain a conjugated diene polymer having an active end, and a second step of causing a compound represented by a following formula (1) to react with the active end of the conjugated diene polymer having an active end.

[First Step]

First, the first step of the method of production of the present invention will be explained. The first step of the method of production of the present invention is a step of polymerizing a monomer containing at least a conjugated diene compound by using a polymerization initiator in an inert solvent so as to obtain a conjugated diene polymer having an active end.

In the first step, the conjugated diene compound used for the polymerization to obtain the conjugated diene polymer having an active end is not particularly limited. For example, 1,3-butadiene, isoprene, 2,3-dimethyl-1,3-butadiene, 1,3-pentadiene, 2-methyl-3-ethyl-1,3-butadiene, 2-methyl-1,3-pentadiene, 1,3-hexadiene, and 1,3-cyclohexadiene may be mentioned. Among these as well, 1,3-butadiene, isoprene, and 1,3-pentadiene are preferable, while 1,3-butadiene and isoprene are particularly preferable. Note that, these conjugated diene compounds may be used as single types alone or may be used as two types or more combined.

Further, in the method of production of the present invention, the conjugated diene polymer having an active end produced in the first step may be a copolymer obtained by copolymerizing an aromatic vinyl compound in addition to the conjugated diene compound. The aromatic vinyl compound is not particularly limited. For example, styrene, α-methylstyrene, 2-methylstyrene, 3-methylstyrene, 4-methylstyrene, 2-ethylstyrene, 3-ethylstyrene, 4-ethylstyrene, 2,4-diisopropylstyrene, 2,4-dimethylstyrene, 4-t-butylstyrene, 5-t-butyl-2-methylstyrene, vinylnaphthalene, dimethylaminomethylstyrene, dimethylaminoethylstyrene, etc. may be mentioned. Among these as well, styrene, α-methylstyrene, and 4-methylstyrene are preferable, while styrene is particularly preferable. Note that these aromatic vinyl compounds may be used as single types alone or may be used as two types or more combined. The conjugated diene polymer having an active end produced in the first step preferably contains 50 to 100 wt % of conjugated diene monomer units, particularly preferably 55 to 100 wt %. Further, the conjugated diene polymer preferably contains 0 to 50 wt % of aromatic vinyl monomer units, particularly preferably 0 to 45 wt %.

Further, in the method of production of the present invention, the conjugated diene polymer having an active end may, as desired, be a copolymer obtained by copolymerizing another monomer in addition to the conjugated diene compound and aromatic vinyl compound in a range not detracting from the object of the present invention. As the other monomer, for example, an α,β-unsaturated nitrile such as acrylonitrile and methacrylonitrile; an unsaturated carboxylic acid and its acid anhydride such as acrylic acid, methacrylic acid, and maleate anhydride; an unsaturated carboxylic acid ester such as methyl methacrylate, ethyl acrylate, and butyl acrylate; a nonconjugated diene such as 1,5-hexadiene, 1,6-heptadiene, 1,7-octadiene, dicyclopentadiene, and 5-ethylidene-2-norbornene; etc. may be mentioned. These other monomers are preferably made 10 wt % or less as monomer units in the conjugated diene polymer having an active end, more preferably 5 wt % or less.

The inert solvent used in the first step of the method of production of the present invention is not particularly limited so long as one usually used in solution polymerization and not obstructing the polymerization reaction. As specific examples of the inert solvent, chain aliphatic hydrocarbons such as butane, pentane, hexane, heptane, and 2-butene; alicyclic hydrocarbons such as cyclopentane, cyclohexane, and cyclohexene; aromatic hydrocarbons such as benzene, toluene, and xylene; etc. may be mentioned. These inert solvents may be used as single types alone or may be used as two types or more combined. The amount of use of the inert solvent is an amount giving a monomer concentration of, for example, 1 to 50 wt %, preferably an amount giving 10 to 40 wt %.

The polymerization initiator is not particularly limited so long as one able to cause the above-mentioned monomer to polymerize so as to give the conjugated diene polymer having an active end. As specific examples, an organic alkali metal compound, an organic alkali earth metal compound, and a polymerization initiator having a lanthanum-series metal compound, etc. as a main catalyst are preferably used. As the organic alkali metal compound, for example, organic monolithium compounds such as n-butyllithium, sec-butyllithium, t-butyllithium, hexyllithium, phenyllithium, and stilbene lithium; organic polyvalent lithium compounds such as dilithiomethane, 1,4-dilithiobutane, 1,4-dilithio-2-ethylcyclohexane, 1,3,5-trilithiobenzene, and 1,3,5-tris(lithiomethyl)benzene; organic sodium compounds such as sodium naphthalene; organic potassium compounds such as potassium naphthalene; etc. may be mentioned. Further, as the organic alkali earth metal compounds, for example, di-n-butylmagnesium, di-n-hexylmagnesium, diethoxycalcium, calcium distearate, di-t-butoxystrontium, diethoxybarium, diisopropoxybarium, diethylmercaptobarium, di-t-butoxybarium, diphenoxybarium, diethylaminobarium, barium distearate, diketylbarium, etc. may be mentioned. As the polymerization initiator having a lanthanum-series metal compound as the main catalyst, for example, a polymerization initiator including a salt of a lanthanum-series metal containing a lanthanum-series metal such as lanthanum, cerium, praseodymium, neodymium, samarium, and gadolinium and a carboxylic acid and phosphorus-containing organic acid etc. as a main catalyst and a co-catalyst such as an alkyl aluminum compound, organic aluminum hydride compound, organic aluminum halide compound etc. may be mentioned. Among these polymerization initiators, an organic monolithium compound and organic polyvalent lithium compound are preferable, an organic monolithium compound is more preferable, and n-butyllithium is particularly preferable. Note that, the organic alkali metal compound may be used as an organic alkali metal amide compound by reacting it in advance with a secondary amine such as dibutylamine, dihexylamine, dibenzylamine, pyrrolidine, hexamethyleneimine, and heptamethyleneimine. These polymerization initiators may be used as single types alone or may be used as two types or more combined.

The amount of use of the polymerization initiator may be determined in accordance with the targeted molecular weight of the polymer, but is usually 1 to 50 mmol with respect to 1000 g of the monomer, usually preferably 1.5 to 20 mmol, more preferably 2 to 15 mmol.

In the first step of the method of production of the present invention, the polymerization temperature is usually −80 to +150° C., preferably 0 to 100° C., more preferably 30 to 90° C. in range. As the polymerization system, any system such as the batch system, continuous system, etc. may be employed, but when making a conjugated diene compound and aromatic vinyl compound copolymerize, the batch system is preferable from the viewpoint that the randomness of the bonds between the conjugated diene monomer units and the aromatic vinyl monomer units becomes easy to control.

In the method of production of the present invention, when the conjugated diene polymer having an active end is comprised of two or more types of monomer units, the binding type may, for example, be various binding types such as block, tapered, or random. The random bonding type is preferable. By making the polymer the random type, the obtained cross-linked rubber becomes particularly excellent in low heat buildup.

Further, in the method of production of the present invention, to adjust the content of vinyl bonds in the conjugated diene monomer units in the conjugated diene polymer having an active end, adding a polar compound to the inert organic solvent at the time of polymerization is preferable. As the polar compound, for example, an ether compound such as dibutylether and tetrahydrofuran; a tertiary amine such as tetramethylethylenediamine; an alkali metal alkoxide; a phosphine compound; etc. may be mentioned. Among these as well, an ether compound and a tertiary amine are preferable, a tertiary amine is more preferable, and a tetramethylethylenediamine is particularly preferable. These polar compounds may be used as single types alone or may be used as two types or more combined. The amount of use of the polar compound may be determined in accordance with the targeted content of vinyl bonds, but is preferably 0.001 to 100 moles with respect to 1 mole of the polymerization initiator, more preferably 0.01 to 10 moles. If the amount of use of the polar compound is in this range, adjustment of the content of the vinyl bonds in the conjugated diene monomer units is easy and problems due to deactivation of the polymerization initiator hardly ever occur.

In the above way, according to the first step of the method of production of the present invention, by polymerizing a monomer containing a conjugated diene compound, it is possible to obtain a conjugated diene polymer having an active end.

In the conjugated diene polymer having an active and obtained at the first step of the method of production of the present invention, the content of the vinyl bonds in the conjugated diene monomer units is preferably 1 to 90 mol %, more preferably 5 to 85 mol %. If the amount of vinyl bonds is in the above range, the obtained cross-linked rubber becomes particularly excellent in low heat buildup.

In the conjugated diene polymer having an active end obtained at the first step of the method of production of the present invention, the peak top molecular weight detected by gel permeation chromatography (below, also referred to as "GPC") is preferably 10,000 to 1,000,000 as a value converted to polystyrene, more preferably 50,000 to 850,000, particularly preferably 100,000 to 700,000. Note that, when a plurality of peaks of the conjugated diene polymer are observed, the peak top molecular weight of the smallest peak of molecular weight derived from the conjugated diene polymer detected by the GPC is made the peak top molecular weight of the conjugated diene polymer having an active end. If the peak top molecular weight of the conjugated diene polymer having an active end is in the above range, the obtained cross-linked rubber becomes particularly excellent in low heat buildup.

The conjugated diene polymer having an active end obtained at the first step of the method of production of the present invention has a molecular weight distribution expressed by the ratio (Mw/Mn) of the weight average molecule weight (Mw) and number average molecular weight (Mn) of preferably 1.0 to 1.5, more preferably 1.0 to 1.4, particularly preferably 1.0 to 1.3. If the value (Mw/Mn) of molecular weight distribution is in the above range, the obtained cross-linked rubber is particularly excellent in low heat buildup.

[Second Step]

Next, a second step of the method of production of the present invention will be explained. The second step of the method of production of the present invention is a step of causing a compound represented by the following formula (1) to react with the active end of the conjugated diene polymer having an active end obtained in the above-mentioned first step so as to obtain modified conjugated diene rubber.

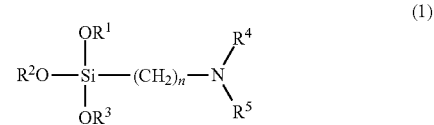

(1)

(In formula (1), each of $R^1$ to $R^3$ independently is an alkyl group having 1 to 4 carbon atoms, $R^4$ is a hydrocarbon group containing an aromatic ring and having 6 to 10 carbon atoms, $R^5$ is an alkyl group having 1 to 6 carbon atoms, and "n" is an integer of 0 to 10.)

In the method of production of the present invention, by causing the compound represented by the above formula (1) to react with the active end of the conjugated diene polymer having an active end obtained in the above-mentioned first step, it is possible to modify the conjugated diene polymer and improve the compatibility of the conjugated diene polymer with a filler such as silica. Due to this, it is possible to obtain a modified conjugated diene rubber able to give a cross-linked rubber excellent in low heat buildup and wet grip.

In the formula (1), each of $R^1$ to $R^3$ independently is an alkyl group having 1 to 4 carbon atoms, preferably a methyl group or ethyl group. $R^1$ to $R^3$ may be the same groups or may be different groups, but from the viewpoint of facilitating the synthesis of the compound represented by the formula (1), preferably they are all the same groups.

Further, in the formula (1), $R^4$ is a hydrocarbon group containing an aromatic ring and having 6 to 10 carbon atoms, preferably a benzyl group, phenethyl group, or phenylpropyl group, more preferably a benzyl group. In the formula (1), by $R^4$ being a hydrocarbon group containing an aromatic ring and having 6 to 10 carbon atoms, for example, compared with using a compound where $R^4$ is a hydrocarbon group not containing an aromatic ring in the formula (1), the obtained modified conjugated diene rubber is improved in compatibility with a filler such as silica and a cross-linked rubber more excellent in low heat buildup and wet grip can be obtained.

Further, in the formula (1), $R^5$ is an alkyl group having 1 to 6 carbon atoms, preferably a methyl group, ethyl group, or propyl group, more preferably a methyl group.

Further, in the formula (1), "n" is an integer of 0 to 10, preferably an integer of 1 to 8, more preferably an integer of 3 to 5.

As specific examples of the compound represented by the above formula (1), 3-(benzylmethylamino)propyltrimethoxysilane, 3-(benzylmethylamino)butyltriethoxysilane, etc. may be mentioned. Among these as well, 3-(benzylmethylamino)propyltrimethoxysilane is particularly preferably used. Note that, the compound represented by formula (1) may be used as single types alone or may be used as two types or more combined.

Further, in the method of production of the present invention, the amount of use of the compound represented by the above formula (1) in the second step is not particularly limited, but the compound represented by the formula (1) is added into the inert solvent in which the conjugated diene polymer having an active end obtained at the first step is present by a ratio of preferably 1 to 3 moles, more preferably 1.0 to 2.0 moles, with respect to 1 mole of the active end of the conjugated diene polymer having an active end. By making the amount of use of the compound represented by the above formula (1) such a range, it is possible to efficiently obtain modified conjugated diene rubber able to give a cross-linked rubber particularly excellent in low heat buildup and wet grip. Note that, the number of the active ends contained in the conjugated diene polymer having an active end in the above-mentioned first step is usually determined by the amount of the polymerization initiator added for polymerization in the first step. For example, when using 1 mole of the polymerization initiator, the number of active ends also becomes 1 mole or so. Further, as explained later, when deactivating part of the active ends before causing the compound represented by the above formula (1) to react with the active end, the amount of "the active ends of the conjugated diene polymer having an active end" is intended to mean the amount of active ends actually remaining at the point of time of adding the compound represented by the formula (1).

If the compound represented by the formula (1) is added in an inert solvent in which the conjugated diene polymer having an active end obtained at the above-mentioned first step is present, the active end of the conjugated diene polymer having an active end and the compound represented by the formula (1) react. This reaction usually proceeds by the formation of a bond between the silicon atom represented by "Si" in the compound represented by the formula (1) and the polymer chain of the conjugated diene polymer and the disassociation of the alkoxy group of the compound represented by the formula (1) (in formula (1), any of the groups represented by "$R^1O$—", "$R^2O$—" and, "$R^3O$—" bonded with the silicon atom represented by "Si") from the compound represented by the formula (1).

In the second step of the method of production of the present invention, the method of causing the compound represented by the above formula (1) to react with the active end of the conjugated diene polymer having an active end obtained in the above-mentioned first step is not particularly limited, but the method of adding and mixing the compound represented by the formula (1) dissolved in a solvent with a solution of the conjugated diene polymer having an active end obtained in above-mentioned first step etc. may be mentioned. As the solvent used at this time, one illustrated as the solvent used for polymerization of the above-mentioned conjugated diene polymer may be used. Further, at this time, the method of rendering the conjugated diene polymer having an active end obtained in the above-mentioned first step a state as the polymerization solution used for polymerization and adding the compound represented by the formula (1) to the same is simple and preferable. Further, at this time, the compound represented by the formula (1) is preferably dissolved in the inert solvent used for the above-mentioned polymerization and then added to the polymerization system. The concentration of the solution is preferably made a range of 1 to 50 wt %. The reaction temperature in the second step is not particularly limited, but is usually 0 to 120° C. The reaction time is not particularly limited, but is usually 1 minute to 1 hour.

The timing of adding the compound represented by the formula (1) to the solution containing the conjugated diene polymer having an active end is not particularly limited, but the compound represented by the formula (1) is preferably added to this solution in the state where the polymerization reaction has not been completed and the solution containing the conjugated diene polymer having an active end also contains the monomer, more specifically the state where the solution containing the conjugated diene polymer having an active end contains 100 ppm or more of monomer, more preferably 300 to 50,000 ppm of monomer. By adding the compound represented by the formula (1) in this way, it becomes possible to suppress a secondary reaction between the conjugated diene polymer having an active end and the impurities contained in the polymerization system and control the reaction well.

Note that before causing the compound represented by the above formula (1) to react with the conjugated diene polymer having an active end, within a range not obstructing the advantageous effect of the present invention, it is also possible to deactivate part of the active ends of the conjugated diene polymer by adding the conventionally normally used coupling agent or modifying agent etc. to the polymerization system.

After causing the compound represented by the above formula (1) to react with the conjugated diene polymer having an active end, if unreacted active end remain, it is preferable to add a polymerization terminator such as an alcohol such as methanol, ethanol, and isopropanol or water to the polymerization solution to deactivate the unreacted active end.

To the above obtained solution of the modified conjugated diene rubber, it is possible to add, as desired, an antioxidant such as a phenol-based stabilizer, phosphorus-based stabilizer, and sulfur-based stabilizer. The amount of the antioxidant added may be suitably determined in accordance with the type etc. Furthermore, if desired, an extension oil may also be blended in to obtain oil-extended rubber. As the extension oil, for example, a petroleum-based softening agent such as paraffin-based, aromatic-based, and naphthalene-based, plant-based softening agent, and fatty acid, etc. may be mentioned. When using a petroleum-based softening agent, the content of polycyclic aromatic which is extracted by the method of IP346 (method of testing of the Institute Petroleum of the UK) is preferably less than 3%. When using the extension oil, the amount of use is usually 5 to 100 parts by weight with respect to 100 parts by weight of the modified conjugated diene rubber.

Further, the modified conjugated diene rubber after the modification reaction obtained in this way is usually treated by steam stripping to remove the solvent. Due to this, the rubber can be separated from the reaction mixture and thereby solid modified conjugated diene rubber can be obtained. Note that, at this time, due to the steam stripping, the hydrocarbyloxy group derived from the compound represented by the above formula (1) introduced into the modified conjugated diene rubber after the modification reaction (in the formula (1), among the groups represented by "$R^1O$—", "$R^2O$—", and "$R^3O$—" bonded with the silicon atom represented by "Si", the one not reacting with the active end of the conjugated diene polymer (that is, other than that disassociated for reaction with the active end of the conjugated diene polymer)) may be considered to have been substituted by a hydroxyl group.

The weight average molecule weight (Mw) of the modified conjugated diene rubber obtained by the method of production of the present invention is not particularly limited, but is usually 1,000 to 3,000,000 as a value measured by gel permeation chromatography converted to polystyrene, preferably 10,000 to 2,000,000, more preferably 100,000 to 1,500,000 in range. By making the weight average molecule weight of the modified conjugated diene rubber the above range, mixing the silica in the modified conjugated diene rubber becomes easy and the rubber composition becomes excellent in processability.

Further, the molecular weight distribution expressed by the ratio (Mw/Mn) of the weight average molecule weight (Mw) and number average molecular weight (Mn) of the modified conjugated diene rubber obtained by the method of production of the present invention is not particularly limited, but is preferably 1.0 to 5.0, particularly preferably 1.0 to 3.0. By making the molecular weight distribution of the modified conjugated diene rubber the above range, the obtained cross-linked rubber becomes excellent in low heat buildup.

Further, the Mooney viscosity ($ML_{1+4}$, 100° C.) of the modified conjugated diene rubber obtained by the method of production of the present invention is not particularly limited, but is usually 20 to 200, preferably 30 to 150 in range. By making the Mooney viscosity of the modified conjugated diene rubber the above range, the processability of the rubber composition becomes excellent. Note that, when making the modified conjugated diene rubber oil extended rubber, the Mooney viscosity of that oil extended rubber is preferably made the above range.

The thus obtained modified conjugated diene rubber may be suitably used for various applications by adding compounding ingredient such as a filler and cross-linking agent. In particular, when mixing in a filler comprised of silica, a rubber composition can be given which can be suitably used for obtaining a cross-linked rubber particularly excellent in low heat buildup and wet grip.

[Rubber Composition]

The rubber composition of the present invention is a rubber composition containing 100 parts by weight of rubber ingredient containing the modified conjugated diene rubber obtained by the above-mentioned method of production of the present invention and 10 to 200 parts by weight of silica.

As the silica used in the present invention, for example, dry-process white carbon, wet-process white carbon, colloidal silica, precipitated silica, etc. may be mentioned. Among these, wet-process white carbon mainly comprising hydrous silicic acid is preferably used. Further, it is also possible to use a carbon-silica dual phase filler comprising carbon black on the surface of which silica is carried. These silica may be used either alone or as a combination of two or more thereof. The nitrogen adsorption specific surface area of the silica used (measured in accordance with ASTM D3037-81 by BET method) is preferably 50 to 300 $m^2/g$, more preferably 80 to 220 $m^2/g$, particularly preferably 100 to 170 $m^2/g$. Further, the pH of the silica is preferably 5 to 10.

In the rubber composition of the present invention, the amount of the silica is 10 to 200 parts by weight with respect to 100 parts by weight of the rubber ingredient in the rubber composition, preferably 30 to 150 parts by weight, more preferably 50 to 100 parts by weight. By making the amount of silica the above range, the processability of the rubber composition becomes excellent, while the obtained cross-linked rubber becomes particularly excellent in wet grip and low heat buildup.

The rubber composition of the present invention may further contain a silane coupling agent from the viewpoint of further improving the low heat buildup property. As the silane coupling agent, for example, vinyl triethoxysilane, β-(3,4-epoxycyclohexyl)ethyl trimethoxysilane, N-(β-aminoethyl)-γ-aminopropyl trimethoxysilane, 3-octathio-1-propyl-triethoxysilane, bis(3-(triethoxysilyl)propyl)disulfide, bis(3-(triethoxysilyl)propyl)tetrasulfide, γ-trimethoxysilylpropyldimethylthiocarbamyl tetrasulfide, γ-trimethoxysilylpropylbenzothiazyl tetrasulfide, etc. may be mentioned. These silane coupling agents may be used respectively alone or as two types or more combined. The amount of the silane coupling agent is preferably 0.1 to 30 parts by weight with respect to 100 parts by weight of silica, more preferably 1 to 15 parts by weight.

Further, the rubber composition of the present invention may further contain carbon black such as furnace black, acetylene black, thermal black, channel black, and graphite. Among these as well, furnace black is preferable. These carbon black may be used respectively alone or as two types or more combined. The amount of the carbon black is not particularly limited, but is usually 120 parts by weight or less with respect to 100 parts by weight of the rubber ingredient in the rubber composition.

Note that, the method of adding silica to the rubber ingredient including the modified conjugated diene rubber of the present invention is not particularly limited. The method of adding it and kneading it to a solid rubber ingredient (dry kneading method), the method of adding it to a solution containing the modified conjugated diene rubber then coagulation and drying the same (wet kneading method) etc. may be used.

Further, the rubber composition of the present invention preferably further contains a cross-linking agent. As the cross-linking agent, for example, a sulfur-containing compound such as sulfur and halogenated sulfur, an organic peroxide, a quinone dioxime, an organic polyvalent amine compound, and an alkyl phenol resin having a methylol group may be mentioned. Among these as well, sulfur is preferably used. The amount of the cross-linking agent is preferably 0.1 to 15 parts by weight with respect to 100 parts by weight of the rubber ingredient in the rubber composition, more preferably 0.5 to 5 parts by weight, particularly preferably 1 to 4 parts by weight.

Furthermore, the rubber composition of the present invention may contain, in addition to the above ingredients, in accordance with an ordinary method, a cross-linking accelerator, cross-linking activator, antioxidant, filler (excluding the above silica and carbon black), activator, process oil, plasticizer, lubricant, tackifier, or the compounding ingredient in the necessary amounts.

When using, as a cross-linking agent, sulfur or sulfur-containing compound, a cross-linking accelerator and a cross-linking activator are preferably jointly used. As the cross-linking accelerator, for example, a sulfenamide-based cross-linking accelerator; guanidine-based cross-linking accelerator; thiurea-based cross-linking accelerator; thiazole-based cross-linking accelerator; thiuram-based cross-linking accelerator; dithiocarbamic acid-based cross-linking accelerator; xantogenic acid-based cross-linking accelerator; etc. may be mentioned. Among these as well, one containing a sulfonamide-based cross-linking accelerator is preferable. These cross-linking accelerators may be used respectively alone or as two types or more combined. The amount of cross-linking accelerator is preferably 0.1 to 15 parts by weight with respect to 100 parts by weight of the rubber ingredient in the rubber composition, more preferably 0.5 to 5 parts by weight, particularly preferably 1 to 4 parts by weight.

As the cross-linking activator, for example, higher fatty acid such as stearic acid; zinc oxide; etc. may be mentioned. These cross-linking activators may be used respectively alone or as two types or more in combination. The amount of cross-linking activator is preferably 0.05 to 20 parts by weight with respect to 100 parts by weight of the rubber ingredient in the rubber composition, particularly preferably 0.5 to 15 parts by weight.

Further, the rubber composition of the present invention may contain other rubber besides the modified conjugated diene rubber obtained by the above-mentioned method of production of the present invention. As the other rubber, for example, natural rubber, polyisoprene rubber, emulsion polymerization styrene-butadiene copolymer rubber, solution polymerization styrene-butadiene copolymer rubber, polybutadiene rubber (either high cis-BR or low cis-BR. Further, may be polybutadiene rubber which contains crystal fibers comprising 1,2-polybutadiene polymer), styrene-isoprene copolymer rubber, butadiene-isoprene copolymer rubber, styrene-isoprene-butadiene copolymer rubber, acrylonitrile-butadiene copolymer rubber, acrylonitrile-styrene-butadiene copolymer rubber, etc. other than the above-mentioned modified conjugated diene rubber may be mentioned. Among these as well, natural rubber, polyisoprene rubber, polybutadiene rubber, and solution polymerization styrene-butadiene copolymer rubber are preferable. These rubbers may be used respectively independently or as two or more types combined.

In the rubber composition of the present invention, the modified conjugated diene rubber obtained by the method of production of the present invention preferably accounts for 10 to 100 wt % of the rubber ingredient in the rubber composition, particularly preferably accounts for 50 to 100 wt %. By including the modified conjugated diene rubber obtained by the method of production of the present invention in the rubber ingredient in such a ratio, it is possible to obtain a cross-linked rubber particularly excellent in low heat buildup and wet grip.

To obtain the polymer composition of the present invention, the components may be kneaded in accordance with an ordinary method. For example, the compounding ingredient other than the cross-linking agent, cross-linking accelerator or other ingredient which is unstable against heat and the modified conjugated diene rubber are kneaded, then the kneaded matter is mixed with the cross-linking agent, cross-linking accelerator or other ingredient which is unstable against heat to obtain the target composition. The kneading temperature of the compounding ingredient other than the ingredient which is unstable against heat and the modified conjugated diene rubber is preferably 80 to 200° C., more preferably 120 to 180° C. and the kneading time of that is preferably 30 seconds to 30 minutes. Further, the kneaded matter is mixed with the cross-linking agent and cross-linking accelerators after cooling usually down to 100° C. or less, preferably 80° C. or less.

[Cross-Linked Rubber]

The cross-linked rubber of the present invention is obtained by cross-linking the above-mentioned rubber composition of the present invention. The cross-linked rubber of the present invention can be produced by using the rubber composition of the present invention, for example, molding it by a molding machine which is designed for the desired shape, for example, an extruder, an injection molding machine, a press, a roll, etc., and heating it to cause a cross-linking reaction and fix the shape as a cross-linked product. In this case, it is possible to shape the composition in advance, then cross-link it or shape and cross-link it simultaneously. The molding temperature is usually 10 to 200° C., preferably 25 to 120° C. The cross-linking temperature is usually 100 to 200° C., preferably 130 to 190° C., while the cross-linking time is usually 1 minute to 24 hours, preferably 2 minutes to 12 hours, particularly preferably 3 minutes to 6 hours.

Further, depending on the shape, size, etc. of the cross-linked rubber, sometimes even if the surface is cross-linked, the inside may not be sufficiently cross-linked, so the cross-linked rubber may be further heated for secondary cross-linking.

As the heating method, press heating, steam heating, oven heating, hot air heating, and other general methods which are used for cross-linking of rubber may be suitable selected.

The thus obtained cross-linked rubber of the present invention is obtained using the modified conjugated diene rubber obtained by the above-mentioned method of production of the present invention, so is excellent in low heat buildup and wet grip due to the high compatibility between the modified conjugated diene rubber and filler such as silica. Therefore, the cross-linked rubber of the present invention obtained by using the modified conjugated diene rubber obtained by the method of production of the present invention is excellent in low heat buildup and wet grip.

Further, making use of such characteristics, the cross-linked rubber of the present invention can be used for example for various applications such as, in tires, the materials of various tire parts such as the cap tread, base tread, carcass, side walls, and beads; the materials of various industrial products such as hoses, belts, mats, and shock absorbing rubber; agents for improving the impact resistance of resins; resin film cushioning; shoe soles; rubber shoes; golf balls; and toys. In particular, the cross-linked rubber of the present invention is excellent in low heat buildup and wet grip, so can be suitably used as a material of a tire, in particular a material of a fuel efficient tire, and is optimum for a tread application.

EXAMPLES

Below, examples and comparative examples will be given to explain the present invention more specifically. Note that, in the examples, "parts" and "%" are based on weight unless otherwise indicated.

The various measurements and evaluations were performed in accordance with the following methods.

[Molecular Weight of Modified Conjugated Diene Rubber]

The molecular weight of the modified conjugated diene rubber was found by gel permeation chromatography as the molecular weight converted to polystyrene. The specific measurement conditions were as follows:

Measuring device: high performance liquid chromatograph (made by Toso, product name "HCFC-8220")

Column: made by Toso, product name "GMH-HR-H", two connected in series.

Detector: differential refractometer

Eluent: tetrahydrofuran

Column temperature: 40° C.

[Low Heat Buildup of Cross-Linked Rubber]

The low heat buildup was evaluated by measuring a test piece of a length 50 mm, width 12.7 mm, and thickness 2 mm using a Rheometrics ARES to obtain tan δ at 60° C. under conditions of a dynamic strain of 2.5% and 10 Hz. The value of this tan δ was shown indexed to the measurement value of Comparative Example 2 as 100. The smaller this index, the better the low heat buildup.

[Wet Grip of Cross-Linked Rubber]

The wet grip was evaluated by measuring a test piece of a length 50 mm, width 12.7 mm, and thickness 2 amusing a Rheometrics ARES to obtain tan δ at 0° C. under conditions of a dynamic strain of 0.5% and 10 Hz. The value of this tan δ was shown indexed to the measurement value of Comparative Example 2 as 100. The larger this index, the better the wet grip.

Example 1

Under a nitrogen atmosphere, an autoclave was charged with 800 parts of cyclohexane, 94.8 parts of 1,3-butadiene, 25.2 parts of styrene, and 0.187 part of tetramethylethylenediamine, then 0.045 part of n-butyllithium was added and the polymerization was started at 60° C. The polymerization reaction was continued for 60 minutes. After confirming the polymerization conversion rate became 95% to 100% in range, 0.224 part of 3-(benzylmethylamino)propyltrimethoxysilane (compound represented by the following formula (2)) (ratio of 1.00 time mole with respect to amount of use of n-butyllithium) was added and made to react for 30 minutes, then a polymerization terminator comprised of 0.064 part of methanol was added to obtain a solution containing a conjugated diene polymer. Further, to 100 parts of the obtained polymer component, 0.15 parts of an antioxidant comprised of 2,4-bis [(octylthio)methyl]-o-cresol (made by Ciba Specialty Chemicals, product name "Irganox 1520") were added to the solution, then steam stripping was performed to remove the solvent and remainder dried in vacuo at 60° C. for 24 hours to obtain a solid modified conjugated diene rubber. The obtained modified conjugated diene rubber of Example 1 had a weight average molecule weight (Mw) of 345,000 and a molecular weight distribution (Mw/Mn) of 1.20.

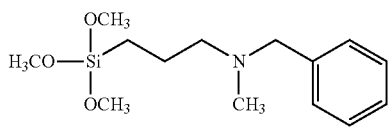

(2)

Example 2

Except for changing the amount of addition of 3-(benzylmethylamino)propyltrimethoxysilane to 0.335 part (ratio of 1.50 times mole with respect to the amount of use of n-butyllithium), the same procedure was followed as in Example 1 to obtain a solid modified conjugated diene rubber. The obtained modified conjugated diene rubber of Example 2 had a weight average molecule weight (Mw) of 300,000 and had a molecular weight distribution (Mw/Mn) of 1.14.

Comparative Example 1

Except for adding, instead of 3-(benzylmethylamino)propyltrimethoxysilane, 0.027 part of N-phenyl-2-pyrrolidone (ratio of 1.00 time mole with respect to the amount of use of n-butyllithium), the same procedure was followed as in Example 1 to obtain a solid modified conjugated diene rubber. The obtained modified conjugated diene rubber of Comparative Example 1 had a weight average molecule weight (Mw) of 254,000 and had a molecular weight distribution (Mw/Mn) of 1.09.

Comparative Example 2

Except for adding, instead of 3-(benzylmethylamino)propyltrimethoxysilane, 0.143 part of 3-(dimethylamino)propyltrimethoxysilane (compound represented by the following formula (3)) (ratio of 1.00 time mole with respect to the amount of use of n-butyllithium), the same procedure was followed as in Example 1 to obtain a solid modified conjugated diene rubber. The obtained modified conjugated diene rubber of Comparative Example 2 had a weight average molecule weight (Mw) of 380,000 and had a molecular weight distribution (Mw/Mn) of 1.20.

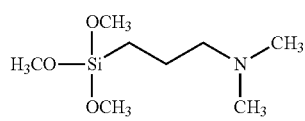

(3)

Comparative Example 3

Except for adding, instead of 3-(benzylmethylamino)propyltrimethoxysilane, 0.156 part of polyorganosiloxane represented by the following formula (4) (ratio of 0.28 time mole with respect to the amount of use of n-butyllithium), the same procedure was followed as in Example 1 to obtain a solid modified conjugated diene rubber. The obtained modified conjugated diene rubber of Comparative Example 3 had a weight average molecule weight (Mw) of 555,000 and had a molecular weight distribution (Mw/Mn) of 1.32.

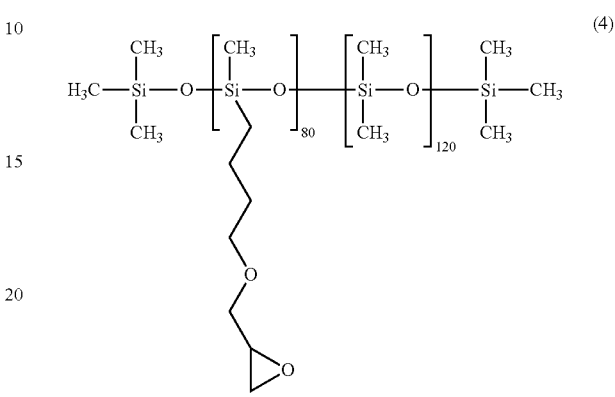

(4)

*Copolymerization type is random.
Number of recurring units is average value.

[Manufacture and Evaluation of Cross-Linked Rubber]

In a volume 250 ml Brabender type mixer, 100 parts of the modified conjugated diene rubber of Example 1 were mastigated for 30 seconds, then 50 parts of silica (made by Rhodia, product name "Zeosil 1115MP"), 20 parts of process oil (made by Nippon Oil Corporation, product name "Aromax T-DAE"), and 6.0 parts of a silane coupling agent comprised of bis(3-(triethoxysilyl)propyl)tetrasulfide (made by Degussa, product name "Si69") were added. The mixture was kneaded at a starting temperature of 110° C. for 1.5 minutes, then 25 parts of silica (made by Rhodia, product name "Zeosil 1115MP"), 3 parts of zinc oxide, 2 parts of stearic acid, and 2 parts of an antioxidant comprised of N-phenyl-N'-(1,3-dimethylbutyl)-p-phenylenediamine (made by Ouchi Shinko Chemical Industrial, product name "Nocrac 6C") were added. The mixture was further kneaded for 2.5 minutes then the kneaded material was discharged from the mixer. The temperature of the kneaded material at the time of end of kneading was 150° C. The kneaded material was cooled down to room temperature, then again kneaded in a Brabender type mixer at a starting temperature of 110° C. for 2 minutes, then the kneaded material was discharged from the mixer. Next, open rolls were used at 50° C. to add, to the obtained kneaded material, 1.40 parts of sulfur, 1.2 parts of a cross-linking accelerator comprised of N-tert-butyl-2-benzothiazolyl sulfenamide (product name "Noccelar NS-P", made by Ouchi Shinko Chemical Industrial) and 1.2 parts of diphenylguanidine (product name "Noccelar D", made by Ouchi Shinko Chemical Industrial). These were kneaded, then a sheet-shaped rubber composition was taken out. This rubber composition was cross-linked by pressing it at 160° C. for 20 minutes to prepare a test piece of cross-linked rubber. This test piece was used to evaluate for low heat buildup and wet grip. The modified conjugated diene rubbers of Example 2, Comparative Example 1, Comparative Example 2, and Comparative Example 3 as well were similarly used to prepare test pieces of cross-linked rubber. These test pieces were used to evaluate for low heat buildup and wet grip. Table 1 summarizes these results.

TABLE 1

| | Example 1 | Example 2 | Comparative Example 1 | Comparative Example 2 | Comparative Example 3 |
|---|---|---|---|---|---|
| modifier | 3-(benzylmethylamino)propyl-trimethoxysilane | 3-(benzylmethylamino)propyl-trimethoxysilane | N-phenyl-2-pyrrolidone | 3-(dimethylamino)propyl trimethoxysilane | Polyorganosiloxane |
| Molar ratio of modifier/active end (n-BuLi) | 1.00 | 1.50 | 1.00 | 1.00 | 0.28 |
| Low heat buildup (index) | 95 | 87 | 125 | 100 | 104 |
| Wet grip (index) | 113 | 108 | 99 | 100 | 104 |

As will be understood from Table 1, the cross-linked rubber obtained using the modified conjugated diene rubber obtained by the method of production of a modified conjugated diene rubber of the present invention (Examples 1 and 2) is better in low heat buildup and wet grip compared with the cross-linked rubber obtained using the modified conjugated diene rubber modified at its end by a conventional technique (Comparative Examples 1 to 3).

The invention claimed is:

1. A method of production of a modified conjugated diene rubber, the method comprising:
a first step of polymerizing a monomer containing at least a conjugated diene compound by using a polymerization initiator in an inert solvent so as to obtain a conjugated diene polymer having an active end, and
a second step of causing a compound represented by a following formula (1) to react with the active end of the conjugated diene polymer having an active end:

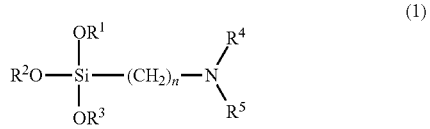

wherein, in the formula (1), each of $R^1$ to $R^3$ independently is an alkyl group having 1 to 4 carbon atoms, $R^4$ is a benzyl group, $R^5$ is an alkyl group having 1 to 6 carbon atoms, and "n" is an integer of 0 to 10.

2. The method of production of a modified conjugated diene rubber according to claim 1, wherein in the second step, the compound represented by the formula (1) is added into an inert solvent in which the conjugated diene polymer having an active end is present in a ratio of 1 to 3 moles with respect to 1 mole of the active end of the conjugated diene polymer having an active end.

3. The method of production of a modified conjugated diene rubber according to claim 1, wherein the conjugated diene polymer having an active end contains 50 to 100 wt % of conjugated diene monomer units and 0 to 50 wt % of aromatic vinyl monomer units.

4. The method of production of a modified conjugated diene rubber according to claim 1, wherein in the formula (1), each of $R^1$ to $R^3$ independently is a methyl group or ethyl group, $R^5$ is a methyl group, ethyl group, or propyl group, and "n" is an integer of 3 to 5.

5. A modified conjugated diene rubber obtained by the method of production of a modified conjugated diene rubber according to claim 1.

6. A rubber composition comprising 100 parts by weight of rubber ingredient containing the modified conjugated diene rubber according to claims 5 and 10 to 200 parts by weight of silica.

7. The rubber composition according to claim 6, further comprising a cross-linking agent.

8. A cross-linked rubber obtained by cross-linking the rubber composition according to claim 7.

9. A tire including the cross-linked rubber according to claim 8.

* * * * *